United States Patent Office 3,829,510
Patented Aug. 13, 1974

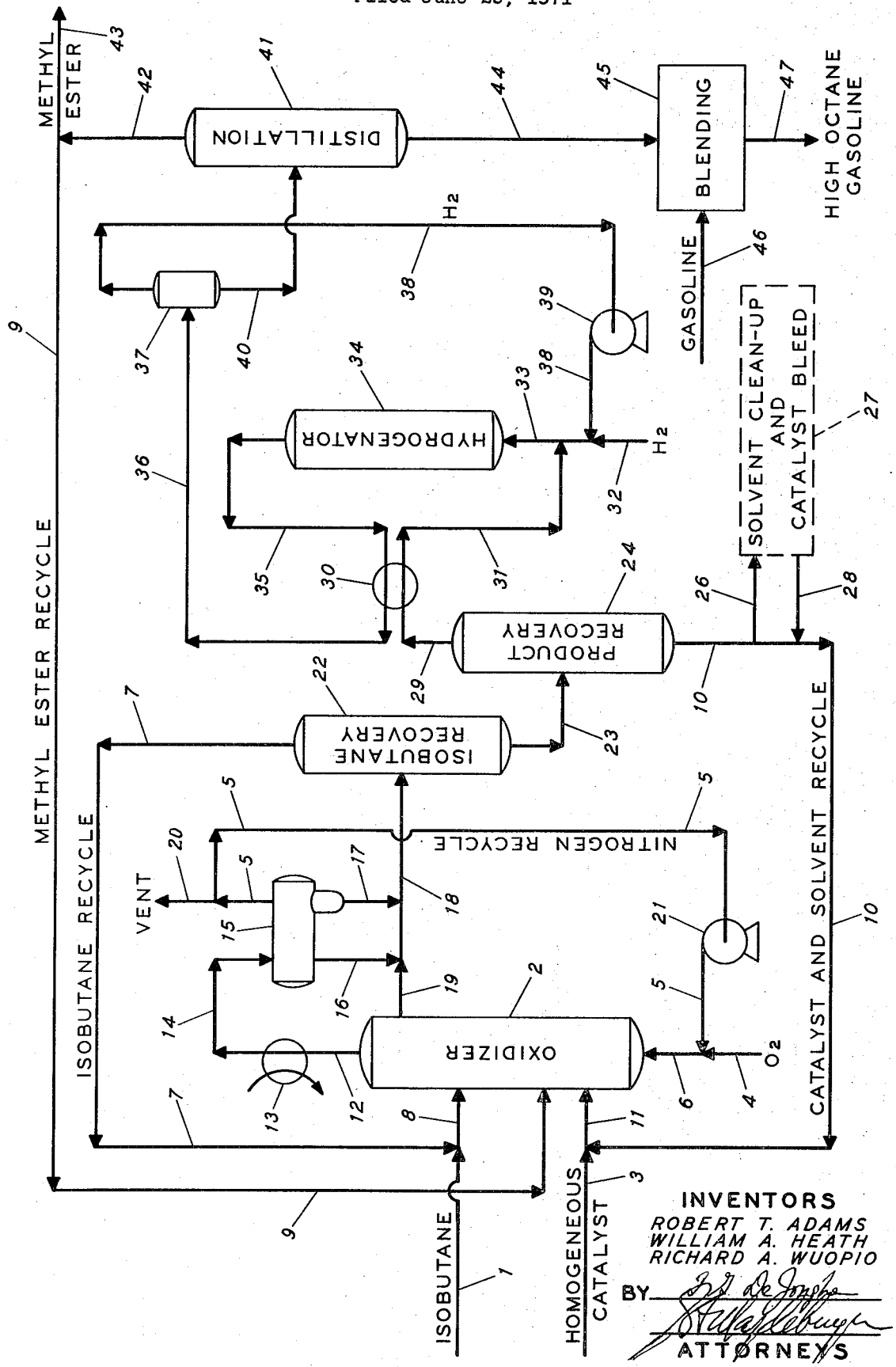

3,829,510
ISOBUTANE OXIDATION TO PRODUCE ALCOHOL USEFUL IN MOTOR FUEL
Robert T. Adams, Lafayette, William A. Heath, Sausalito, and Richard A. Wuopio, San Rafael, Calif., assignors to Chevron Research Company, San Francisco, Calif.
Filed June 25, 1971, Ser. No. 163,515
Int. Cl. C07c 27/12, 31/02
U.S. Cl. 260—632 C
7 Claims

ABSTRACT OF THE DISCLOSURE

A process for producing high-octane lead-free or low-lead content gasoline which comprises:

(a) oxidizing isobutane in an oxidation zone by contacting the isobutane in liquid phase with gaseous oxygen, and recycled methyl ester, and an added homogeneous catalyst in an organic acid solvent, to obtain a product comprising a mixture of t-butyl alcohol, acetone, methanol, and methyl ester;
(b) passing at least a portion of the mixture to a hydrogenation zone and hydrogenating the acetone to obtain a mixture comprising t-butyl alcohol, isopropyl alcohol, methanol, and methyl ester;
(c) separating at least methyl ester from the t-butyl alcohol, isopropyl alcohol, and methanol;
(d) recycling the methyl ester to the oxidation zone.

CROSS-REFERENCE TO RELATED APPLICATION

The commonly assigned and concurrently filed patent application of J.W. Rosenthal and R. H. Kozlowski entitled "Gasoline Production" Ser. No. 163,518, now abandoned, is a related application and its disclosure is incorporated by reference into the present application.

BACKGROUND OF THE INVENTION

The present invention relates to production of high-octane unleaded or low-lead content gasoline in a combination process involving the oxidation of isobutane and the hydrogenation of acetone.

The term "high-octane gasoline" is used in the present specification to mean gasolines having an F-1 research octane number of at least 80, and usually about 90 or more. The term "low-lead content" is used to mean lead additive concentrations less than 1.5 grams of lead additive compound per gallon of gasoline.

The use of alcohols in gasoline-boiling-range hydrocarbons to improve the octane rating of the gasoline has been disclosed previously. For example, U.S. Pat. 2,128,910 discloses the use of methanol and ethanol in gasoline together with propanol and butanol to aid in keeping the methanol and ethanol in solution with the gasoline. U.S. Pat. 2,408,999 also discloses the use of alcohols having three to five carbon atoms as blending components for gasoline.

Alcohols are most frequently produced from olefins, but also may be produced by paraffin oxidation. Production of $C_4$ alcohols by oxidation of butane using a homogeneous catalyst is disclosed in U.S. Pats. 2,265,948, 2,492,985, 2,659,746, and 2,704,294, the disclosures of which patents are incorporated by reference into the present specification. According to U.S. Pat. 2,492,985, the oxidation of butane is carried out substantially completely in the vapor phase using a catalytic liquid in the form of a thin film which is preferably flowing. The catalytic liquid forming the film may itself be a catalyst or it may comprise a carrier liquid containing a catalyst either in suspension or solution.

A carrier liquid for the butane oxidation catalyst is preferably inert to oxidation or is similar or identical to one or more of the oxidation-resistant products of the oxidation. Alkanoic acids such as acetic, propionic or butyric acids, carbon tetrachloride, benzene, phenylacetic acid, acetic anhydride, water, and the like, may be used as a carrier liquid for organic or inorganic salts or oxides of cerium, cobalt, copper, manganese, silver or uranium; and other liquid carriers and catalysts such as those disclosed in U.S. Pat. No. 2,265,948, issued to D. J. Loder on Dec. 9, 1941, may be used.

As indicated previously, the present invention is related to hydrogenation as well as oxidation.

Considerable work has been done in the field of catalytic chemistry with a view to developing efficient materials for the hydrogenation of unsaturated compounds such as the olefins and a large number of other compounds containing unsaturated functions, such as ketones. Much of this work has been based upon the classical discovery of Sabatier, that finely divided metallic nickel is capable of causing the union of hydrogen with these compounds. This method has been further expanded and supplemented by the work of Ipatieff on the application of high pressures to these reactions. Extensive research has been carried out heretofore with the result that several different methods for the preparation of hydrogenation catalysts have been developed, the most common of which involve the precipitation and reduction of nickel or copper hydroxides or carbonates, reduction of nickel or copper oxides prepared by ignition of the nitrates, heating to their decomposition temperatures of certain organic salts of hydrogenating metals and electro-chemical deposition of the metals. Furthermore, various methods of reduction have been proposed ranging from the ordinary dry reduction with hydrogen to reduction in an inert liquid vehicle or in the presence of the oil or other substance undergoing hydrogenation.

U.S. Pat. 2,137,407 discloses the use of copper chromite catalyst for various hydrogenation and dehydrogenation reactions. U.S. Pat. 2,137,407 also discloses the use of catalysts comprising copper, chromium and barium for hydrogenation reactions. J. Marsh in his textbook, *Advanced Organic Chemistry: Reactions, Mechanisms, and Structure*, McGraw-Hill, 1968, dicloses at pages 678–681 various means for reducing aldehydes and ketones to alcohols. Included in the reduction methods mentioned are the use of lithium aluminum tetrahydride; hydrogen and a catalyst (with the most common catalysts being platinum, nickel, copper-chromite, and ruthenium); sodium ethoxide in ethanol, isopropyl alcohol and aluminum isopropoxide; diborane as a reducing agent; and diimide as a reducing agent.

In Europe, nickel catalysts and high hydrogen partial pressure have been used in commercial processes to prepare isopropyl alcohol from acetone. A recent U.S. patent, No. 3,499,938, titled "Conversions of Ketones to Carbinols," discloses the hydrogenation of ketones such as acetone to alcohol using rhodium oxide and an alkali metal hydrogenation catalyst impregnated in an inert carrier.

The present invention, as indicated previously, relates to a hydrogenation step following an oxidation step. U.S. Pat. 3,014,970 discloses the formation of oxygen-containing organic compounds such as aldehyde, followed by a hydrogenation step to convert the aldehyde to the corresponding alcohol. In U.S. Pat. 3,014,970, the oxygen-containing organic compounds are formed by a hydroformylation reaction, that is, by the reaction of an olefin, carbon monoxide and hydrogen in the presence of a cobalt-containing catalyst. U.S. Pat. 3,014,970 is not concerned with hydroxylation, as is the case with the present invention. U.S. Pat. 3,014,970 is not directed to the formation of high-octane unleaded or low-lead content gasoline, but instead is directed to the separation of a cobalt catalyst in between the hydroformylation and hydrogenation steps. Also, U.S. Pat. 3,014,970 is not directed to removal of compounds such as organic acids from the feed to a hydrogenation step.

SUMMARY OF THE INVENTION

According to the present invention, a process is provided for producing high-octane, lead-free or low-lead content gasoline which comprises:

(a) oxidizing isobutane in an oxidation zone by contacting the isobutane in liquid phase with gaseous oxygen, and recycled methyl ester, and an added homogeneous catalyst in an organic acid solvent, to obtain a product comprising a mixture of t-butyl alcohol, acetone, methanol, and methyl ester;

(b) passing at least a portion of the mixture to a hydrogenation zone and hydrogenating the acetone to obtain a mixture comprising t-butyl alcohol, isopropyl alcohol, methanol, and methyl ester;

(c) separating at least methyl ester from the t-butyl alcohol, isopropyl alcohol, and methanol;

(d) recycling the methyl ester to the oxidation zone.

The term "gaseous oxygen" is used in the present specification to include gaseous oxygen present with other gases such as in air as well as relatively pure gaseous oxygen.

Preferably the added homogeneous catalyst is a metal acetate such as cobalt acetate, lead acetate, cadmium acetate, or magnesium acetate, and the organic acid solvent is a carboxylic acid such as acetic acid.

Using the preferred acetic acid solvent, methyl acetate is formed of methanol formed in the oxidation zone with the acetic acid. Even when the acetic is not used as a solvent, there is some acetic acid present in the oxidation reaction zone as a by-product of the isobutane oxidation. Usually the isobutane feed contains some normal butane. We have found that the normal butane tends to increase the amount of acetic acid produced in the oxidation step.

In order to produce a desirable blend of alcohols for increasing the octane of gasoline-boiling-range hydrocarbons, in accordance with the process of the present invention we have found that it is important to avoid methyl acetate in the mixed alcohol product because, among other factors, of the high solvency of the ester toward paints and lacquers used on automobiles.

Initially, it was hoped that in the process sequence of the present invention the methyl ester, particularly methyl acetate, could be hydrogenated to convert the ester to alcohols. However, we have found that attempts to hydrogenate the methyl acetate ester to methanol and ethanol are largely unsuccessful; high temperatures are required for the methyl acetate hydrogenation, and the high temperatures cause side reactions including the hydrogenation of the t-butyl alcohol product. The t-butyl alcohol is particularly desired in the final alcohol mix to be blended to obtain the product high-octane gasoline.

Furthermore, we have found that direct separation of methyl acetate (boiling point 57° C.) by distillation is not possible because it boils so close to acetone (boiling point 56.5° C.), one of the major products of the isobutane oxidation step.

However, we have found a solution to the problem indicated by the above-mentioned factors. In accordance with the present invention the methyl acetate is separated from the oxidation zone product *after* the hydrogenation step, that is, the methyl acetate is separated from t-butyl alcohol, isopropyl alcohol, and methanol, and *then recycled* to the oxidation step.

Thus, in the process of the present invention the isobutane oxidation product is hydrogenated under relatively mild conditions which convert all the acetone to isopropyl alcohol but leave essentially all of the methyl acetate unhydrogenated.

Preferred operating conditions for the hydrogenation zone include the use of a nickel catalyst such as nickel on an alumina and/or silica support (such as kieselguhr) or a copper containing hydrogenation catalyst, such as a copper-chromium-barium catalyst as described, for example, in Example 3 of U.S. Pat. 2,137,407, the disclosure of which patent is incorporated by reference into the present patent application. Suitable mild hydrogenation conditions include a temperature between about 150° to 350° F., preferably between about 200° to 250° F., a hydrogen partial pressure between about 15 and 2000 p.s.i.g., preferably between about 100 and 1000 p.s.i.g., and a liquid hourly space velocity (LHSV) between about 4 and 60, preferably between about 10 and 40. These mild conditions for the hydrogenation step in the process of the present invention are sharply different from hydrogenation conditions directed to obtain methyl acetate hydrogenation in addition to acetone hydrogenation. The hydrogenation conditions in the process of the present invention are maintained sufficiently mild so that less than 10 percent (and usually under the preferred conditions less than 5 percent) of the t-butyl alcohol is hydrogenated in the hydrogenation zone.

After hydrogenation the methyl acetate is separable from methanol (boiling point 65° C.), except for some possible formation of methanol-methyl acetate azeotrope. However, the azeotrope can also be recycled with the methyl acetate to the oxidation step. In the hydrogenation step, according to the present invention, the acetone which boils so close to methyl acetate is converted to the relatively higher-boiling constituent, isopropyl alcohol (boiling point 82.5° C.).

An important feature of the present invention is the recycling of methyl acetate to the isobutane oxidizer to allow its concentration in the oxidation reaction mixture to build up to a level which controls (usually suppresses) net formation of methyl acetate. Thus, in the process of the present invention the methyl acetate plays the important function of control for the oxidation step reactions.

The methyl acetate is recycled to control the equilibrium of the esterification reaction $$CH_3OH + CH_3COOH \rightleftharpoons CH_3COOCH_3 + H_2O$$

The metal salt (e.g. lead acetate) which is used to catalyze the oxidation of isobutane also catalyzes the above esterification reaction essentially to equilibrium. We have found that essentially equilibrium for the above-mentioned esterification reaction is attained in about 30 minutes, compared to an oxidation reactor residence time typically of about two hours. Thus the methyl acetate recycle according to our invention achieves good control of the ester and methanol products from the oxidation reaction zone in part because the esterification reaction relatively rapidly equilibrates.

Advantages of the process of the present invention include:

(1) Minimum loss of methanol by conversion to methyl acetate;

(2) Hydrogenation can be carried out at higher rates and lower temperatures and pressures than required for ester hydrogenation, as shown in Table I below;

(3) Methyl acetate eliminated from high octane product gasoline.

TABLE I

|  | Acetone hydrogenation only | Ester hydrogenation |
| --- | --- | --- |
| LHSV | 20–40 | 2–4 |
| Temperature, ° F. | 100–250 | >350 |
| Pressure, p.s.i.g. | 50–200 | 1,000 |

Among other factors, the present invention is based on the choice of particular process steps and the finding that substantial amounts of acetone and t-butyl alcohol are formed in the oxidation of liquid-phase isobutane to t-butyl alcohol and that the acetone can be converted to isopropyl alcohol by mild hydrogenation conditions to obtain a tertiary butyl alcohol-isopropyl alcohol mixture which is particularly advantageous for blending with gasoline-boiling-range hydrocarbons to obtain a high-octane gasoline. Although acetone has been suggested as a high octane gasoline blending component, acetone does not have as high an octane blending number as isopropyl alcohol, and acetone has other disadvantages relative to isopropyl alcohol as a gasoline blending component.

The temperature used in the oxidation zone can be between about 200° and 600° F., but it is preferred to use a temperature between about 200° and 400° F., and in our process it is particularly preferred to use a temperature between about 240° and 280° F. The 240° to 280° F. temperature range is particularly preferred for the oxidation of isobutane in liquid phase in the presence of a homogeneous catalyst in accordance with the present invention because we have found that within this temperature range, coupled with the other conditions of the present invention, a high selectivity to tertiary butyl alcohol is obtained and there is less decomposition of reaction products to carbon monoxide, acetone, and methyl alcohol.

The primary other condition of operation in accordance with the present invention, which is coupled with the 240° to 280° F. operating temperature range, is the use of added homogeneous catalysts (particularly some form of metal acetate in a lower carboxylic acid solution). The homogeneous catalyst has been found to increase the selectivity of the reaction to t-butyl alcohol, which we have found is highly desirable as a blending octane component in gasoline compared to most other alcohols. Also, the homogeneous catalyst has been found to markedly decrease the amount of formic acid formed in the oxidation reaction, whereas in the non-catalyst liquid phase oxidation of isobutane formic acid is a very harmful impurity which is formed.

Preferably, the pressure is sufficient to maintain the reaction substantially in the liquid phase. Pressures between about 300 and 3000 p.s.i.g. can be employed, although 450 to 1500 p.s.i.g. is a more usual range, with 550 to 650 p.s.i.g. being preferred in the present invention.

The residence time for the hydrocarbon feed in the oxidation reactor is preferably adjusted so as to achieve 20 to 50 percent conversion of the isobutane to oxidized products. More preferably, the conversion is adjusted by the residence time and temperature to between 30 and 40 percent per-pass conversion. The preferred temperature and percent conversion on a one-pass basis cooperate to produce a product which is predominantly tertiary butyl alcohol and acetone and which is very lean in peroxides.

The hydrogenation step of the present invention is critically important in that it serves to convert acetone to isopropyl alcohol. More importantly, the hydrogenation step serves to increase the octane blending number of the oxidized mixture produced in accordance with the present invention. Peroxides which are present in the effluent from the oxidation zone are very deleterious to the octane blending number of the oxidized mixture, and the hydrogenation step of the present invention serves to eliminate the peroxides, as well as converting acetone to a higher octane component, namely isopropyl alcohol.

In the process of the present invention it is of critical importance to employ the hydrogenation step before the methyl acetate separation step. As indicated previously, the methyl acetate is not hydrogenated at suitable conditions (that is, at conditions wherein t-butyl alcohol is not significantly destroyed) in the hydrogenation zone. However, after the hydrogenation zone, methyl acetate can be separated by distillation because acetone is converted to the relatively higher-boiling 3-carbon-atom component, isopropyl alcohol, by the hydrogenation step. Thus, in the process of the present invention, neither acetone nor isopropyl alcohol is lost to any large extent when methyl acetate is separated by distillation from t-butyl alcohol.

BRIEF DESCRIPTION OF THE DRAWING

The drawing is a schematic process flow diagram illustrating a preferred embodiment of the present invention.

DETAILED DESCRIPTION OF THE DRAWING

Referring now more particularly to the drawing, isobutane obtained, for example, from a hydrocracking process is introduced via line 1 to oxidation zone 2. The isobutane is oxidized by contacting isobutane with oxygen introduced via line 4.

It is critically important in the present invention that methyl ester, preferably methyl acetate, is recycled as indicated by lines 9 and 42 from distillation column 41. Thus the isobutane oxidation is carried out in the presence of the recycled methyl ester.

Also, the isobutane oxidation is preferably carried out in the presence of a homogeneous catalyst introduced via line 3, and also recycled together with organic acid solvent via line 10. The fresh or makeup catalyst and recycled catalyst and solvent are introduced to the oxidizer via line 11. Unreacted isobutane is recycled via line 7 and fed to the reactor together with fresh isobutane via line 8.

Preferred operating conditions for the oxidation in zone 2 include a temperature between about 220 and 280° F. and a pressure of about 600 p.s.i.g. Recycle isobutane is usually withdrawn from isobutane recovery zone 22 at a pressure below 600 p.s.i.g., and therefore is passed through a compressor before re-introduction to zone 2.

Air or oxygen is introduced to the reactor via lines 4 and 6. Preferably oxygen is used to avoid the necessity of an air compressor, particularly when a large plant is available for pressurized (pipeline) pure oxygen. To avoid explosion hazard from the use of oxygen in the presence of isobutane, nitrogen is recycled via line 5 through recycle compressor 21. The nitrogen and oxygen are introduced via line 6 at an oxygen concentration of 8 volume percent. Maintaining the oxygen level in the oxidizer below about 8 percent avoids an oxygen-isobutane explosion hazard.

The oxidation zone vapor product is withdrawn via line 12, cooled in exchanger 13 to condense partially vaporized isobutane, and then introduced via line 14 to overhead vessel 15. Isobutane is withdrawn from the overhead vessel via line 16. This isobutane may contain some oxygenated products. A water-alcohol organic acid phase is withdrawn via line 17. A vent of carbon oxides, which may build up in the system, can be taken via line 20 from the nitrogen recycle line 5.

The isobutane and water-alcohol phases are fed via line 18, and line 19 from the top of the oxidizer liquid phase, to isobutane recovery zone 22. In recovery zone 22 isobutane is distilled overhead for recycle via line 7 through the oxidizer. Exemplary operating conditions for the isobutane distillation in zone 22 are 150 p.s.i.a., 145° F. for the top of the distillation column; 155 p.s.i.a., 350° F. for the bottom. The product alcohols and acetone and water are withdrawn from distillation zone 22 via line 23.

From the bottom of product recovery fractionation zone 24 organic acid solvent and homogeneous catalyst are withdrawn via line 10 for recycle through the oxidation step. The solvent can be cleaned up and a portion of the catalyst and solvent can be bled off as indicated by lines 26 and 28 to and from zone 27. The preferred acetic acid solvent as well as the catalyst are heavier than the alcohols and acetone produced in the oxidation zone. Thus, whereas the catalyst and solvent are withdrawn from the bottom of zone 24, the alcohol and acetone and water are withdrawn from the overhead via line 29.

The alcohols and acetone are heated in exchanger 30 and then fed via lines 31 and 33 to hydrogenator 34. In hydrogenator 34 acetone is hydrogenated to isopropyl alcohol. Hydrogen is introduced via lines 32 and 33. As indicated previously under Summary of the Invention, the hydrogenation conditions are maintained relatively mild to effect the acetone hydrogenation but yet essentially completely avoid hydrogenation of t-butyl alcohol. This is a critical aspect of the present invention, as t-butyl alcohol is particularly desired as a product alcohol for blending in the final product gasoline of the present invention.

Tertiary butyl alcohol, isopropyl alcohol, methanol and methyl acetate are withdrawn via line 35 from the hydrogenator, cooled in exchanger 30 and then passed via line 36 to drum 37. In drum 37 hydrogen is separated from the hydrogenator effluent for recycle via line 38 through recycle compressor 39. The hydrogen can be passed cocurrently or upflow countercurrently with the oxidizer effluent fed to the hydrogenator via line 31.

Tertiary butyl alcohol, isopropyl alcohol, methanol and methyl acetate are withdrawn via line 40 from the bottom of drum 37 and introduced to distillation column 41. Methyl acetate is distilled overhead and withdrawn via line 42 for recycle via line 9 to oxidizer 2. A bleed stream of methyl acetate can be withdrawn from the process via line 43. The bleed stream of methyl acetate can be omitted, in which case it is usually necessary to bleed off some acetic acid, for example via line 26. However, the methyl acetate can advantageously be used to control the removal of acetic acid from oxidizer 2. Removal of methyl acetate via line 43 results in less recycle methyl acetate and hence less methyl acetate in oxidizer 2, which in turn results in the reaction of more acetic acid (and thus the removal of more acetic acid) from oxidizer zone 2 according to the reaction:

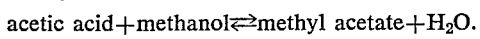

acetic acid+methanol⇌methyl acetate+H$_2$O.

The product mixture of alcohols, that is, t-butyl alcohol, isopropyl alcohol and methanol are withdrawn via line 44 from the distillation column and blended in zone 45 with gasoline-boiling-range hydrocarbons introduced via line 46. The gasoline-boiling-range hydrocarbons usually boil within the range from about pentane to about 430° F. Gasoline-boiling-range hydrocarbons from hydrocracking are particularly preferred, as hydrocracking is preferably operated in combination with the process of the present invention to provide both gasoline-boiling-range hydrocarbons for blending in zone 45 and isobutane for feed to oxidizer zone 2.

The alcohol mixture withdrawn in line 44 usually will contain 1 to 10 volume percent water upon blending the alcohol mixture produced. When the product alcohols are blended with gasoline hydrocarbons in accordance with the process of the present invention, substantial amounts of water will separate as a separate phase. The product high-octane gasoline which is withdrawn in line 47 will thus usually be withdrawn from the upper part of tanks in which the product gasoline is stored.

Although various embodiments of the invention have been described, it is to be understood that they are meant to be illustrative only and not limiting. Certain features may be changed without departing from the spirit or scope of the present invention. The present invention has broad application to the production of high-octane gasoline in a process including isobutane oxidation followed by a hydrogenation step followed by a methyl ester separation step and the recycling of separated methyl ester to the oxidation step. Accordingly, the invention is not to be construed as limited to the specific embodiments or examples discussed but only as defined in the appended claims or substantial equivalents thereto.

What is claimed is:

1. In a process for producing at least one alcohol, which comprises contacting in an oxidation zone isobutane in the liquid phase with gaseous oxygen in the presence of a homogeneous oxidation catalyst and an alkanoic acid solvent, thereby obtaining a product mixture including methyl acetate, acetone, methanol and t-butyl alcohol, the improvement of upgrading the quality of said product mixture which comprises:
   (a) accomplishing said oxidation at a temperature of 200°–600° F., and at a pressure of 300–3000 p.s.i.g.;
   (b) contacting said product mixture with hydrogen in the presence of a platinum, nickel, copper, ruthenium or rhodium hydrogenation catalyst at a temperature of 150°–350° F., a liquid hourly space velocity of 4–60, and a hydrogen partial pressure of 15–2000 p.s.i.g. to obtain a product containing methanol, isopropyl alcohol and t-butyl alcohol;
   (c) separating at least methyl acetate from the methanol, isopropyl alcohol, and t-butyl alcohol; and
   (d) recycling said methyl acetate to said oxidation zone to suppress the esterification reaction of methanol and acetic acid.

2. A process as in Claim 1 wherein less than 10 percent of said t-butyl alcohol is hydrogenated.

3. A process as in Claim 2, wherein said temperature is 200°–250° F.

4. A process as in Claim 2 wherein the hydrogenation products of step (b) comprising methanol, t-butyl alcohol and isopropanol are recovered.

5. A process as in Claim 1, wherein said oxidation catalyst is a metal acetate selected from the group consisting of cobalt acetate, lead acetate, cadmium acetate and magnesium acetate and said alkanoic solvent is acetic acid.

6. A process as in Claim 1, wherein the oxygen concentration in said oxidation zone is maintained at a level below 8 volume percent.

7. A process as in Claim 1 wherein the hydrogenation catalyst is nickel or copper chromium-barium.

References Cited

UNITED STATES PATENTS

| | | | |
|---|---|---|---|
| 2,265,948 | 12/1941 | Loder | 260—632 C |
| 3,576,891 | 4/1971 | Rosenthal | 44—56 |
| 2,087,582 | 7/1937 | Schneider | 44—56 |
| 3,558,687 | 1/1971 | Russell | 260—643 B |
| 3,384,672 | 5/1968 | Illingworth | 260—643 B |

OTHER REFERENCES

Winkler et al.: "I. & E. C.," vol. 53 (1961), pp. 655–658.

JOSEPH E. EVANS, Primary Examiner

U.S. Cl. X.R.

44—56; 260—448 R, 541, 632 R, 638 B, 643 B